Jan. 15, 1946.    A. EBERHARD    2,393,029
COUNTERWEIGHT ARRANGEMENT ON CRANK DRIVE
Filed Jan. 2, 1941    2 Sheets-Sheet 1
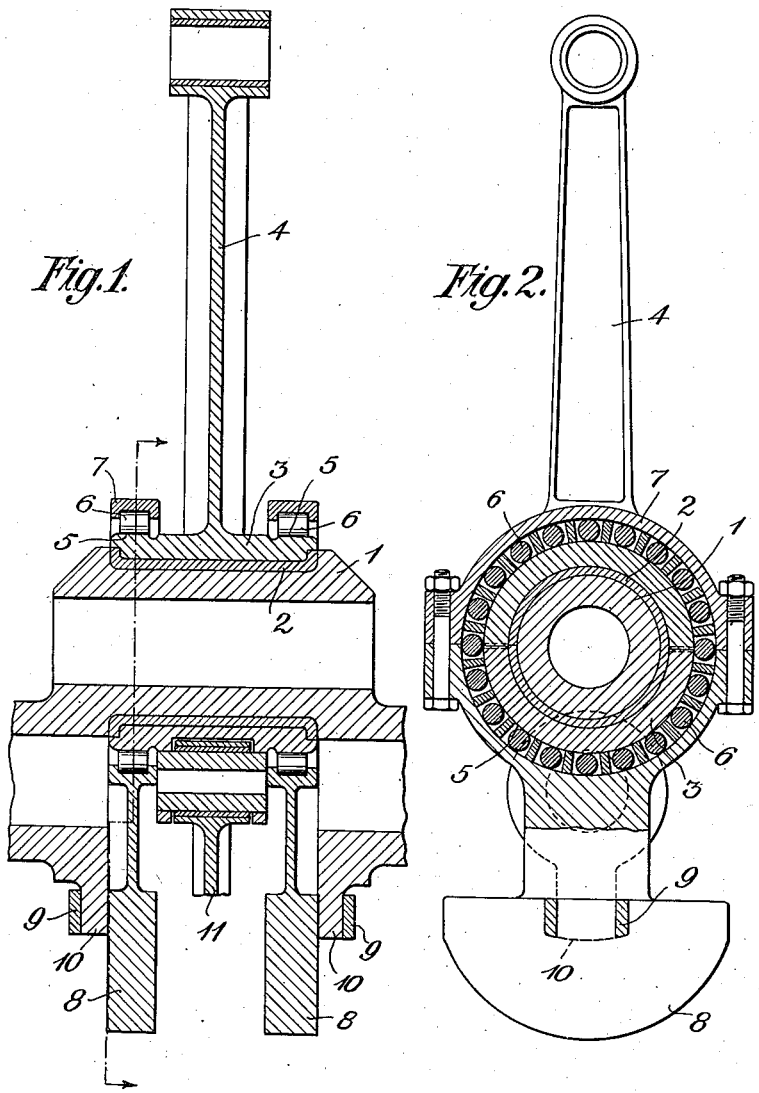
INVENTOR
Albert Eberhard
BY
ATTORNEYS Jan. 15, 1946.  A. EBERHARD  2,393,029
COUNTERWEIGHT ARRANGEMENT ON CRANK DRIVE
Filed Jan. 2, 1941  2 Sheets-Sheet 2
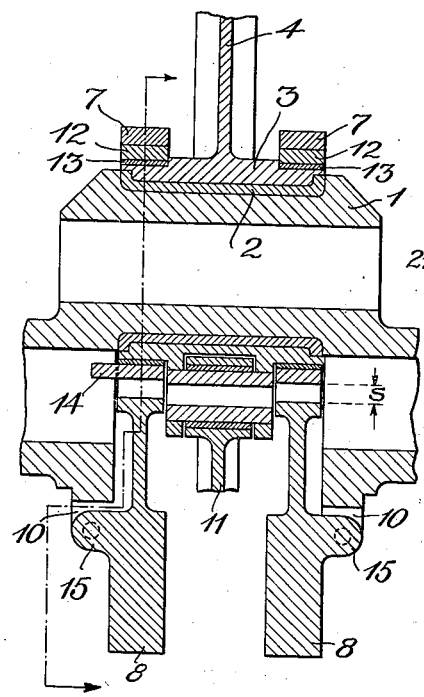
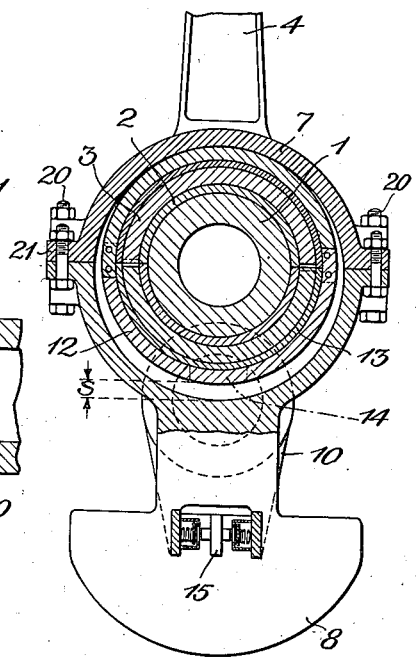
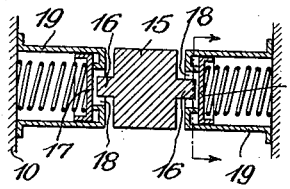
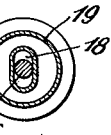
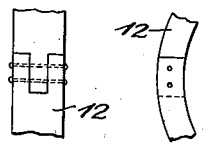
INVENTOR
Albert Eberhard
BY
ATTORNEYS Patented Jan. 15, 1946

2,393,029

UNITED STATES PATENT OFFICE 2,393,029

COUNTERWEIGHT ARRANGEMENT ON CRANK DRIVES

Albert Eberhard, Stuttgart-Wangen, Germany; vested in the Alien Property Custodian Application January 2, 1941, Serial No. 372,870
In Germany December 27, 1939

7 Claims. (Cl. 74—603)

The present invention relates to a counterweight arrangement on crank drives, particularly crank drives of piston engines having cylinders mounted in star-shaped fashion, for instance of internal combustion engines.

Hitherto the counterweights were exclusively arranged on the crank shaft. They serve the purpose of balancing the forces occurring at the crank shaft and thereby relieving the bearings of the crank shaft, so that the forces occurring in these bearings may without difficulty be governed. By a simple enlargement of the counterweights it would then always be possible to increase the number of revolutions without increasing the load acting upon the crank shaft bearings, if this measure or step would not be opposed to by the increasing stress on the connecting rod bearings.

The present invention obviates this draw-back and consists in the arrangement of the counterweights on the big end of the connecting rod. Hereby the rotating inertia forces are balanced at the point of origin, i. e., at the big end of the connecting rod itself. If the rotating masses of the connecting rods are balanced, then with increasing number of revolutions the relatively small oscillating inertia forces only are increased. Consequently, the number of revolutions may extraordinarily be increased without exceeding the permissible loads of the bearings at the end of the connecting rod. This arrangement according to the invention has a particularly favorable effect in connection with motors arranged in star-shaped fashion in which the oscillating inertia forces are nearly independent on the crank angle so that they also may be balanced for the greater part. In the arrangement according to the invention the counterweights not only act upon the connecting rod bearings but, by way of the webs of the crank shafts, also upon the crank bearings and this in exactly the same manner as the counterweights hitherto mounted at the crank webs.

By a slight alteration of the construction, the counterweights may also be formed as centrifugal pendulums adapted to absorb torsional vibrations, if the counterweights are suspended with play on rings loosely mounted upon further rings. These last mentioned rings on the one hand are pivotally mounted upon the end of the connecting rod at both sides of this rod and on the other hand are connected to the crank shaft in a manner to rotate with the latter. The amplitudes of the oscillations of the counterweights are limited by resilient steps which are rendered effective only, after a predetermined amplitude of the oscillations of the counterweights has been reached.

In the accompanying drawings two constructions according to the invention are shown by way of example.

In these drawings:

Figs. 1 and 2 show in longitudinal- and cross-section respectively simple counterweight arrangements on the end of a connecting rod, Figs. 3 and 4 show a longitudinal- and a cross-section respectively of a counterweight arrangement simultaneously acting as oscillation absorber, and Figs. 5 to 8 illustrate on a larger scale details of the modification shown in Figs. 3 and 4.

In the construction illustrated in Fig. 1 a plain bearing 2 is provided upon the crank pin 1. Slidably arranged upon this is the end 3 of the connecting rod. At both sides of the connecting rod 4 and as far as possible towards the exterior the end 3, the connecting rod 4 is provided with two raceways 5, 5 each supporting a roller bearing 6 on the outer rings 7, 7 of which the counterweights 8, 8 are suspended or favourably a sliding bearing or another suitable bearing. The counterweights each have an external yoke 9, 9 into which engages projections 10, 10 extending downwardly from the crank shaft web. On rotation of the crank shaft, the projections 10 carry with them the counterweights, so that with regard to the axis of the crank shaft the counterweights always are located opposite the end of the connecting rod and in this manner neutralize the centrifugal forces of the latter. By means of the projections 10 the counterweights 8 are also axially fixed.

When using a main connecting rod with a plurality of auxiliary connecting rods, the auxiliary connecting rods 11 preferably are, as may be seen from Fig. 1, arranged in the centre plane of the main connecting rod between the counterweights 8. The operation of this device easily may be understood from the drawings and has been exhaustively explained in the preamble to the specification.

The modification of the device shown in Figs. 3 and 4 substantially corresponds to the device illustrated in Figs. 1 and 2 with the difference, however, that according to the construction shown in Figs. 3 and 4 each of the bearing rings 7, 7 of the counterweights 8, 8 is suspended with a certain play "s" from another bearing ring 12, 12. These bearing rings 12, 12 are arranged upon sliding rings 13, 13 which are provided on the head of the connecting rod in place of the roller raceways. Moreover, the bearing rings 12, 12 are coupled to the crank shaft by pins 14, 14 and rotate with this shaft. Instead of the yokes 9, as shown in Figs. 1 and 2, each of the counterweights 8, shown in this construction, is provided with a downwardly extending outwardly directed flange 15, 15 (Fig. 5) having two stops 16, 16 at each side. Opposite these stops spring buffers 17, 17 are located which are provided at the crank shaft webs 10, 10.

The arrangement is such that the stops 16 have a certain freedom of movement within the plane of oscillation of the counterweights 8 before they come into contact with the spring buffers 17. In a direction vertically to the plane of oscillations the counterweights at the stops 16 are guided in slots 18 of the casings 19 of the spring buffers 17 as may be gathered from Fig. 6. This slot guide has the purpose of preventing oscillating movements of the counterweights in the direction of the axis of the crank shaft. In order to allow an easy mounting of all the bushings and bearing rings without being compelled to divide the crank shaft these rings are subdivided to a large extent. The sliding bearing 2 consists of two ordinary bearing bushing-halves. The big end 3 of the connecting rod also is subdivided in the usual manner and the two parts are screwed together, as shown at 20 in Fig. 4. The sliding ring 13 too is formed of two parts which in the manner of a two-part thin-walled bearing bushing are kept together by pressure exerted by pressing. The bearing ring 12 also is formed of two parts and the ends of the two ring halves are joined by mortise and riveted together as shown in Figs. 7 and 8. The bearing ring 7 of the counterweights 8 also is constructed in two parts and at 21 the two ring halves are screwed together.

The arrangement according to Figs. 3 and 4 acts in exactly the same manner as the construction according to Figs. 1 and 2 and, moreover, in the manner whereby the pendulum mass is energized to a frequency which counteracts the frequencies occurring at the crank shaft. The invention also may be employed in engines with cylinders arranged in series in one row.

Having now particularly described and ascertained the nature of my said invention and in what manner the same is to be performed I declare that what I claim is:

1. In combination, a crank shaft having at least one crank, a connecting rod journaled at one end on said crank, a counterweight swingably connected to the journaled end of said connecting rod and positioned diametrically opposite said crank relatively to the axis of said crank shaft, and means connected to said crank shaft for yieldably limiting the swinging motion of said counterweight in a plane perpendicular to the axis of the crank, whereby, upon rotation of said crank shaft, said counterweight acts both to balance the forces on the crank and absorb torsional oscillations.

2. In combination, a crank shaft having at least one crank, a connecting rod journaled at one end on said crank, a counterweight swingably connected to the journaled end of said connecting rod and positioned diametrically opposite said crank relatively to the axis of said crank shaft, and resilient buffers intermediate said counterweight and said crank shaft for yieldably limiting motion of said counterweight in a plane perpendicular to the axis of the crank whereby, upon rotation of said crank shaft, said counterweight acts both to balance the forces on the crank and absorb torsional oscillations.

3. In combination, a crank shaft having at least one crank, a connecting rod journaled at one end on said crank, a counterweight swingably connected with play to the journaled end of said connecting rod and positioned diametrically opposite said crank relatively to the axis of said crank shaft, means for preventing relative longitudinal movement between said counterweight and said crank shaft, and means connected to said crank shaft for yieldably limiting the swinging motion of said counterweight in a plane perpendicular to the axis of the crank, whereby, upon rotation of said crank shaft, said counterweight acts both to balance the forces on the crank and absorb torsional oscillations.

4. In combination, a crank shaft having at least one crank, a connecting rod journalled at one end on said crank, a counterweight swingably connected with play to the journaled end of said connecting rod and positioned diametrically opposite said crank relatively to the axis of said crank shaft, means for preventing relative longitudinal movement between said counterweight and said crank shaft, and resilient buffers intermediate said counterweight and said crank shaft for yieldably limiting the swinging motion of said counterweight in a plane perpendicular to the axis of the crank, whereby, upon rotation of said crank shaft, said counterweight acts both to balance the forces on the crank and absorb torsional oscillations.

5. In combination, a crank shaft having at least one crank, a connecting rod journaled at one end on said crank, a counterweight swingably connected to the journaled end of said connecting rod, a flange extending outwardly from said counterweight, having stops on either side, web sections connected to said crank shaft diametrically opposite to said crank, relatively to the axis of said crank shaft, and extending on opposite sides of said flange adjacent said stops, and resilient abutments on said web sections adjacent to but spaced from said stops, whereby said counterweight may swing freely between said resilient abutment for short oscillations, but will be resiliently limited by said abutment upon larger oscillations.

6. The combination according to claim 5, in which said web sections are provided with further means engaging said stops to prevent relative longitudinal movement between said counterweight and crank shaft.

7. In combination, a crank shaft having at least one crank, a connecting rod journaled at one end on said crank, a counterweight swingably connected with play to the journaled end of said connecting rod, a flange extending outwardly from said counterweight, having stops on either side, web sections connected to said crank shaft diametrically opposite to said crank, relatively to the axis of said crank shaft, and extending on opposite sides of said flange adjacent said stops, resilient buffers on said web sections, adjacent to but spaced from said stops, whereby said counterweight may swing freely between said resilient abutment for short oscillations, but will be resiliently limited by said abutment upon larger oscillations, said web sections being provided with further means engaging said stops to prevent relative longitudinal movement between said counterweight and said crank shaft.

ALBERT EBERHARD.